(12) United States Patent
Oohara

(10) Patent No.: US 8,116,027 B2
(45) Date of Patent: Feb. 14, 2012

(54) LIBRARY APPARATUS, AND INSERTION AND EJECTION MECHANISM

(75) Inventor: Tsuneyoshi Oohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 12/342,840

(22) Filed: Dec. 23, 2008

(65) Prior Publication Data
US 2009/0161250 A1 Jun. 25, 2009

(30) Foreign Application Priority Data

Dec. 25, 2007 (JP) .................. 2007-331942

(51) Int. Cl.
*G11B 17/00* (2006.01)
*G11B 5/008* (2006.01)

(52) U.S. Cl. ............. 360/88; 360/90; 360/91; 360/92.1; 360/93; 360/94

(58) Field of Classification Search .................... 360/88, 360/90, 91, 92.1, 93, 94
See application file for complete search history.

(56) References Cited

U.S. PATENT DOCUMENTS

| | | | | | |
|---|---|---|---|---|---|
| 5,237,468 | A | * | 8/1993 | Ellis | 360/92.1 |
| 5,742,445 | A | * | 4/1998 | Inazawa et al. | 360/92.1 |
| 6,005,745 | A | * | 12/1999 | Filkins et al. | 360/92.1 |
| 6,008,964 | A | * | 12/1999 | Goodknight et al. | 360/92.1 |
| 6,023,391 | A | * | 2/2000 | Yamakawa et al. | 360/92.1 |
| 6,034,928 | A | * | 3/2000 | Inoue | 360/92.1 |
| 6,144,520 | A | * | 11/2000 | Yamakawa et al. | 360/92.1 |
| 6,144,521 | A | * | 11/2000 | Egan et al. | 360/92.1 |
| 6,175,466 | B1 | * | 1/2001 | Hori et al. | 360/92.1 |
| 6,236,530 | B1 | * | 5/2001 | Schneider et al. | 360/92.1 |
| 6,239,941 | B1 | * | 5/2001 | Small | 360/92.1 |
| 7,433,150 | B2 | * | 10/2008 | Hoelsaeter | 360/92.1 |
| 7,480,118 | B2 | * | 1/2009 | Ojima et al. | 360/92.1 |
| 7,532,431 | B2 | * | 5/2009 | Solhjell | 360/92.1 |
| 7,719,790 | B2 | * | 5/2010 | Armagost et al. | 360/92.1 |
| 7,782,565 | B2 | * | 8/2010 | Starr | 360/92.1 |

FOREIGN PATENT DOCUMENTS

| | | |
|---|---|---|
| JP | 5-020766 | 1/1993 |
| JP | 11-185352 | 7/1999 |
| JP | 2001-126367 | 5/2001 |
| JP | 2003-115158 | 4/2003 |

\* cited by examiner

*Primary Examiner* — Trong Phan
(74) *Attorney, Agent, or Firm* — Fujitsu Patent Center

(57) ABSTRACT

A library apparatus includes a housing, an insertion and ejection mechanism that is provided in an opening formed in the housing and that is configured to insert and eject a magazine, the magazine being arranged to accommodate a cartridge that includes a storage medium, a drive mechanism configured to access the storage medium and a transporting mechanism configured to transport the cartridge to a predetermined position. The insertion and ejection mechanism includes a magazine receiving section having an engagement section configured to be engaged with a portion of the magazine, a guide rail configured to slidably support the magazine receiving section, and a wall member configured to move together with the magazine receiving section along the guide rail and to close the opening upon an ejection of the magazine from the insertion and ejection mechanism.

13 Claims, 20 Drawing Sheets

LIBRARY APPARATUS, AND INSERTION AND EJECTION MECHANISM

CROSS-REFERENCE TO RELATED APPLICATIONS

This application is related to and claims priority to Japanese patent application no. 2007-331942 filed on Dec. 25, 2007 in the Japan Patent Office, the entire contents of which are incorporated by reference herein.

BACKGROUND

1. Field

Embodiments of the present invention relate to a library apparatus and an insertion and ejection mechanism.

2. Description of the Related Art

Library apparatuses that accommodate a large number of tape cartridges for storage have been available as apparatuses for storing a large amount of information. In a library apparatus, cartridges from and to which information is to be read and written are sequentially removed and are placed in a writing and reading apparatus to read and write the information. The cartridges are typically accommodated in an accommodation rack provided in the apparatus. Accommodation racks include a fixed rack fixedly provided in the apparatus, and a rack removable from the apparatus, called a magazine. The accommodated cartridges are transported to a writing and reading apparatus or a desired accommodation rack using a cartridge transporting mechanism.

When a cartridge is to be ejected from the library apparatus, a magazine in which the desired cartridge is accommodated is to be removed from the library apparatus. When a cartridge is to be inserted in the library apparatus, a magazine in which the desired cartridge is to be accommodated is also to be removed from the library apparatus.

Generally, in middle-size or small-size library apparatuses, after a magazine is removed from the apparatuses, a space where the magazine was accommodated becomes empty. This increases the potential risk of injury to an operator because the operator may put his/her hand into a library apparatus. The library apparatus has a cartridge transporting mechanism as described above incorporated therein. If the operator puts his/her hand into the apparatus, the hand may be injured by the operation of the cartridge transporting mechanism.

To overcome such a potential hazardous situation, a library apparatus that is provided with a door on the front thereof so that a magazine may not be removed until the door is opened has been proposed. In this library apparatus, the door is manually closed after a magazine has been removed so that the space from which the magazine has been taken may be closed.

As an alternative, a disc changer configured to insert and eject a magazine in a manner similar to that of a library apparatus has been proposed, wherein an opening into and from which a magazine is inserted and removed is provided with a door and the door is automatically or manually closed after the magazine has been removed.

With the mechanism for manually closing the door after a magazine has been removed, if the operator forgets to close the door, since a space where a magazine is usually accommodated is open to the outside, the operator may also accidentally put his/her hand into the space. If the operator has closed the door, a different person may easily open the door.

With the mechanism for automatically closing the door, the door is closed after a magazine has been removed. However, due to this mechanism having a structure in which the door is pushed and opened by a magazine when the magazine is inserted, there is still a risk that the operator may accidentally put his/her hand into the inside because the door may also be pushed and opened by the operator's hand.

It is therefore desirable to provide a locking mechanism that locks a door so that the door may not be opened or an auxiliary mechanism or the like for shutting off the inside of the apparatus from the outside thereof even if a door opening and closing mechanism is broken. In this case, a space for the locking mechanism or auxiliary mechanism is required in the library apparatus. However, particularly in middle-size or small-size library apparatuses, due to the demand for high-density mounting, it is difficult to set aside a space for such a mechanism.

SUMMARY

Accordingly, at least one embodiment of the present invention provides a library apparatus that comprises a housing, an insertion and ejection mechanism that is provided in an opening formed in the housing and that is configured to insert and eject a magazine, the magazine being arranged to accommodate a cartridge that includes a storage medium, a drive mechanism configured to access the storage medium and a transporting mechanism that allows the cartridge to move to a predetermined or set position. The insertion and ejection mechanism that includes a magazine receiving section including an engagement section arranged to be engaged with a portion of the magazine, a guide rail configured to slidably support the magazine receiving section, and a wall member configured to move together with the magazine receiving section along the guide rail and that closes the opening when the magazine is being ejected from the insertion and ejection mechanism.

BRIEF DESCRIPTION OF THE DRAWINGS

Embodiments are illustrated by way of example and not limited by the following figures.

DESCRIPTION OF EXAMPLES OF EMBODIMENTS

Figure 1:
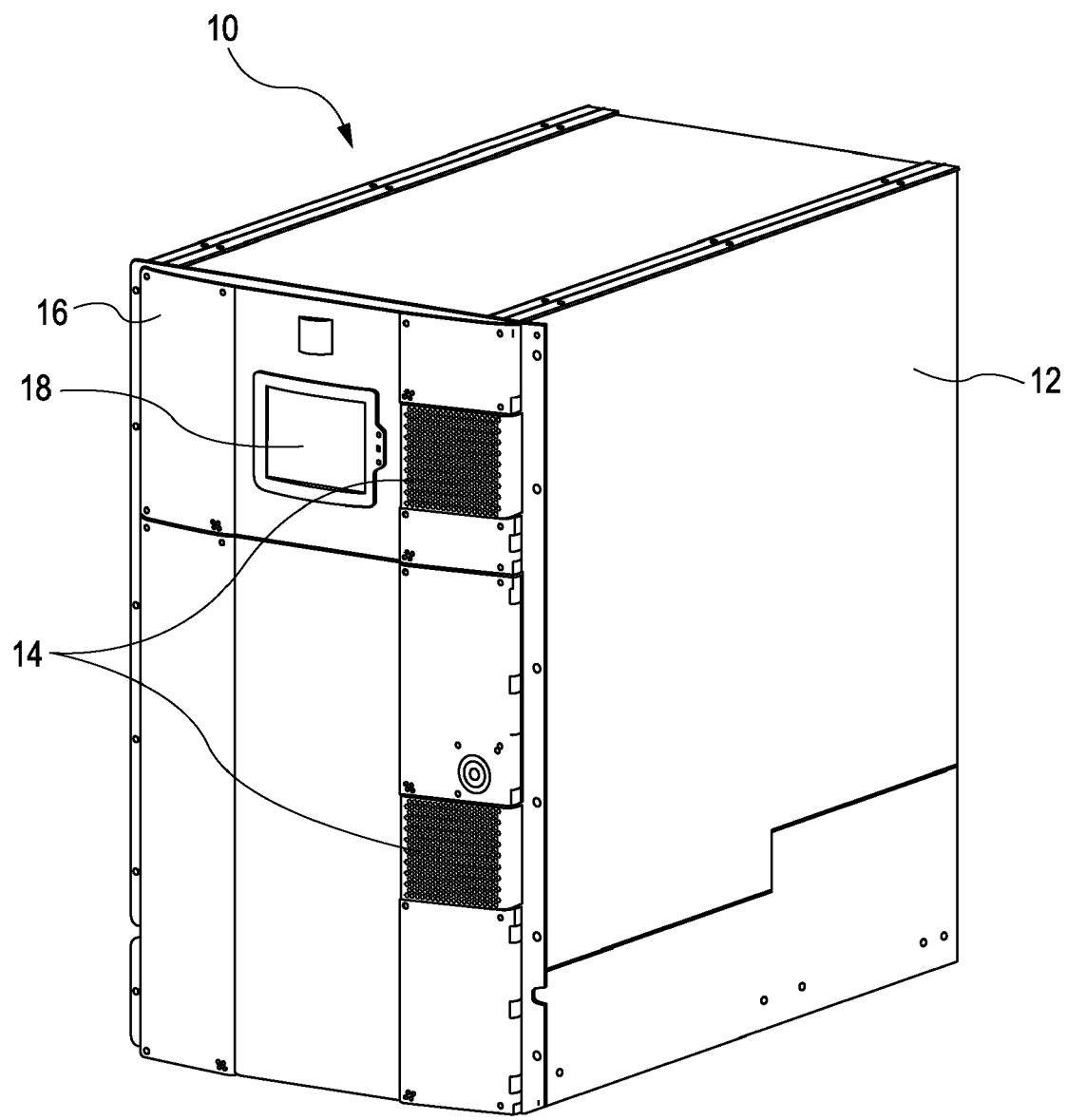
FIG. 1 depicts a perspective view of a library apparatus, according to an example of an embodiment of the present invention.

FIG. 1 depicts a perspective view of a library apparatus 10. The library apparatus 10 may be an information storing apparatus configured so that information recorded on a tape cartridge serving as a storage medium accommodated in the library apparatus 10 may be retrieved as desired. Inside a housing 12 of the library apparatus 10, a large number of accommodation racks (not shown) are arranged and each of the accommodation racks accommodates a tape cartridge. A tape cartridge in the library apparatus 10 is transported to a drive mechanism (not shown) by a transporting mechanism (not shown) provided within the housing 12. The drive mechanism reads or writes information from or to the tape cartridge. Specifically, in the housing 12 of the library apparatus 10, a specified tape cartridge is transported to a predetermined or set position of the drive mechanism, i.e., a writing or reading position, by the transporting mechanism. Then, the specified tape cartridge is accessed by the drive mechanism.

In order to insert or eject a tape cartridge into or from the library apparatus 10, one or a plurality of tape cartridge accommodation boxes called magazines 14 are accommodated in the library apparatus 10. Each of the magazines 14 is capable of accommodating a plurality of tape cartridges, for example, nine tape cartridges.

A front panel 16 forming a portion of the housing 12 of the library apparatus 10 is provided with an operation panel 18 serving as a display input section for operating the library apparatus 10. The operation panel 18 may be a touch panel on which an operating status, input information, etc., of the library apparatus 10 are displayed. An operator may input an instruction to the library apparatus 10 through the operation panel 18 on the basis of information displayed on the operation panel 18.

Figure 2:
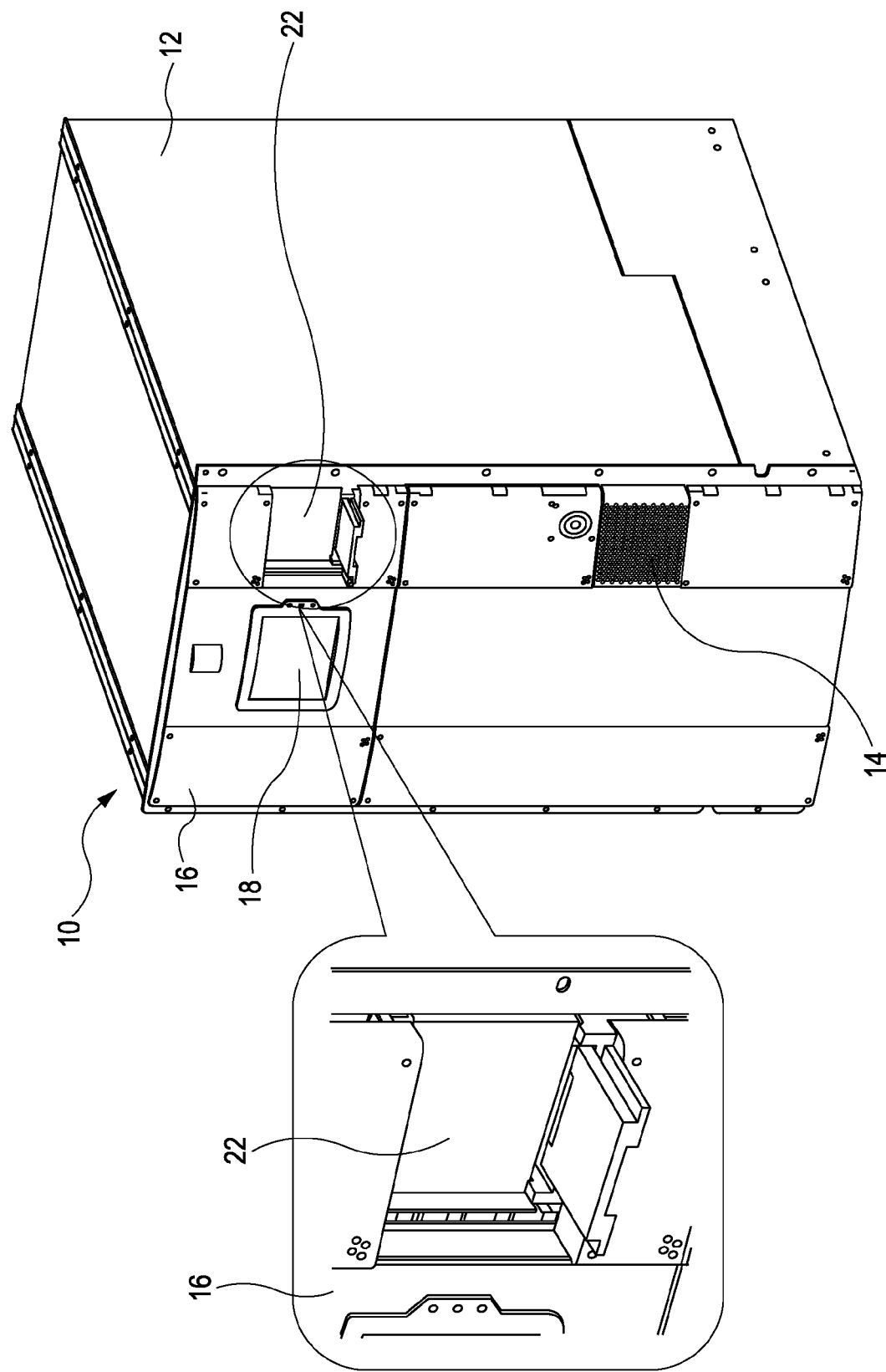
FIG. 2 depicts a perspective view of the library apparatus after a magazine has been removed from a front panel thereof, according to an example of an embodiment of the present invention.

The library apparatus 10 accommodates two magazines 14. The magazines 14 are removable from the front panel 16 of the library apparatus 10. FIG. 2 depicts a perspective view of the library apparatus 10 after one of the magazines 14 has been taken from the front panel 16 of the library apparatus 10. In FIG. 2, an opening from which the magazine 14 has been taken is shown in an enlarged manner.

The magazines 14 are accommodated in the library apparatus 10 and ejected from inside the library apparatus 10 using an insertion and ejection mechanism 20 (see FIG. 3) incorporated in the library apparatus 10. In the library apparatus 10 shown in FIG. 2, the upper magazine 14 has been ejected. A large opening is defined in the front panel 16, from which the magazine 14 has been taken, and a wall member 22 is provided in the vicinity of an entrance of the opening to close the opening. In accordance with an operation of ejecting the magazine 14 from the library apparatus 10, the wall member 22 is moved to near the opening in the front panel 16 from the rear of the library apparatus 10. Then, the wall member 22 is fixed slightly in front of the front panel 16.

Figure 3:
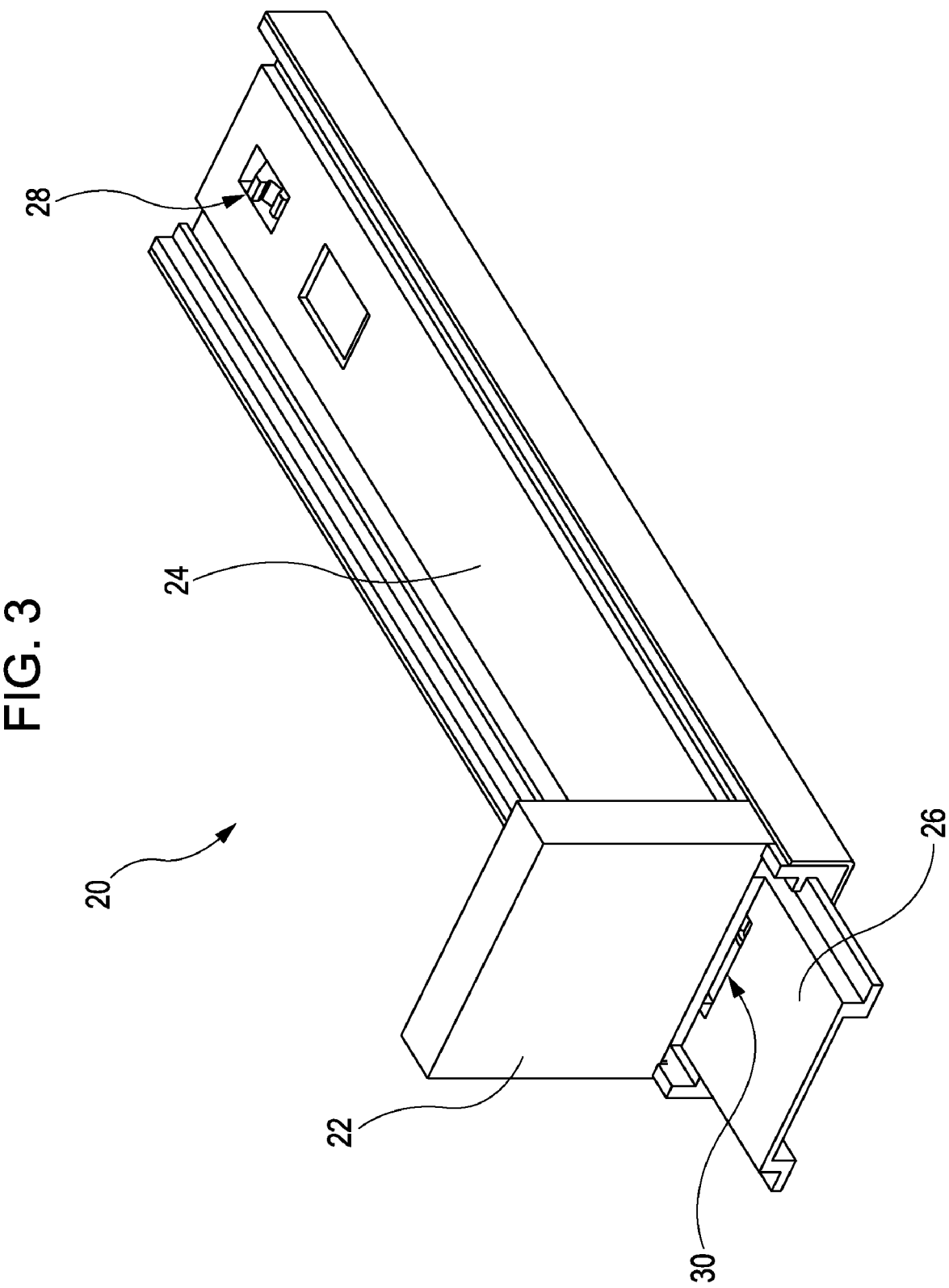
FIG. 3 depicts a perspective view of an insertion and ejection mechanism for inserting and ejecting a magazine, according to an example of an embodiment of the present invention.

FIG. 3 depicts a perspective view of the insertion and ejection mechanism 20 for inserting and ejecting the magazine 14. In FIG. 3, the insertion and ejection mechanism 20 after the magazine 14 has been ejected in the manner shown in FIG. 2 is illustrated. The insertion and ejection mechanism 20 includes the wall member 22 described above, a rail section 24, a magazine receiving section 26, a magazine locking mechanism 28, and a wall member locking mechanism 30 (see FIG. 4).

The rail section 24 serving as a guide rail is incorporated in the library apparatus 10. The rail section 24 extends horizontally toward the rear of the library apparatus 10 from the opening in the front panel 16. The magazine receiving section 26 is configured so as to slidably move along the rail section 24. The magazine receiving section 26 may therefore be guided by the rail section 24 so as to move forward and backward along the rail section 24. The term "forward" as used herein refers to the direction extending toward the front panel 16, and the term "backward" as used herein refers to the direction apart from the front panel 16 and extending to the rear side of the library apparatus 10. In FIG. 3, the magazine receiving section 26 is moved and positioned at a most front portion of the rail section 24.

Figure 4:
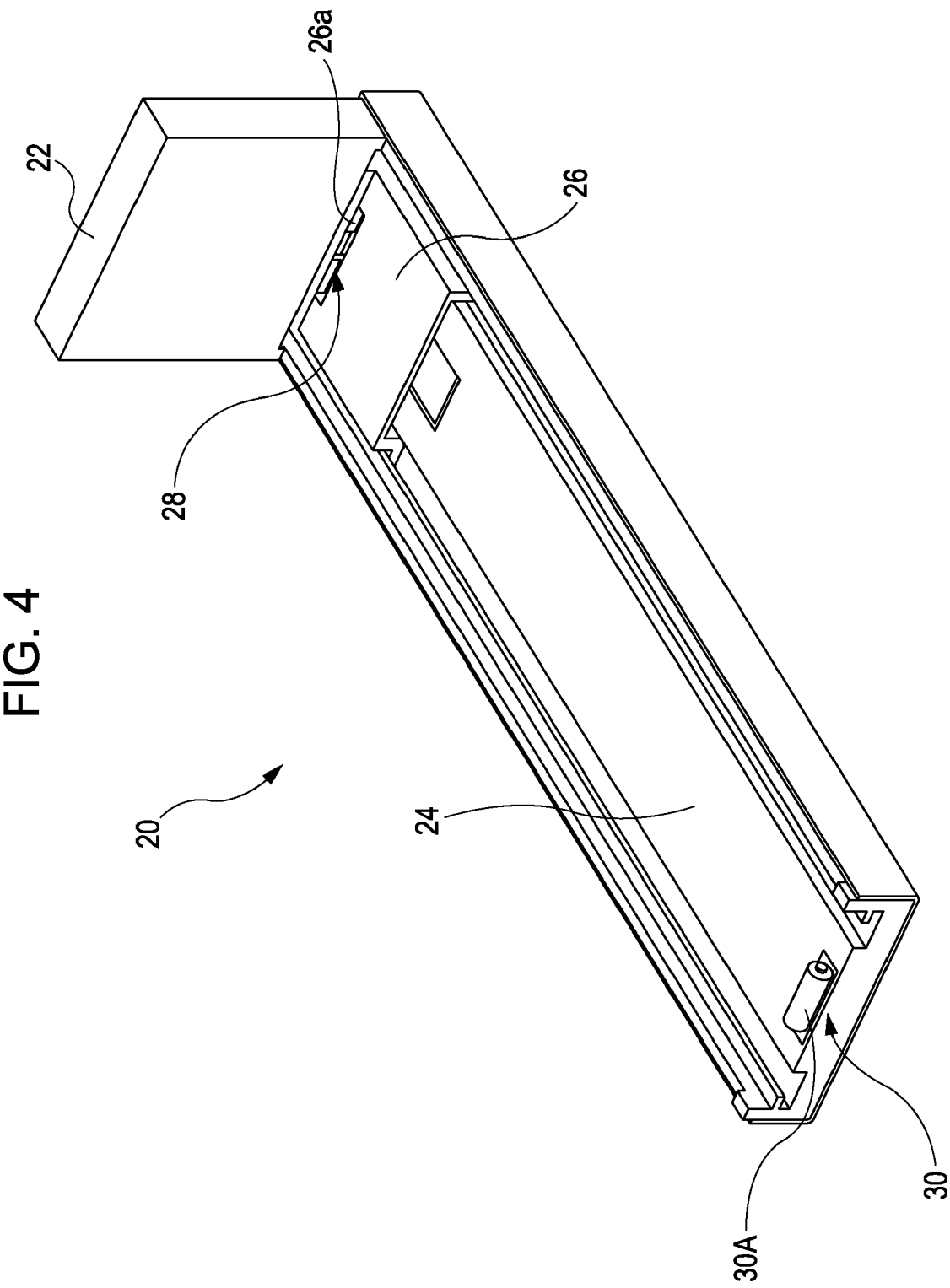
FIG. 4 depicts a perspective view of the insertion and ejection mechanism when a magazine receiving section is moved and positioned at a most rear portion of a rail section, according to an example of an embodiment of the present invention.

The wall member 22 is fixed to the magazine receiving section 26. The wall member 22 slidably moves along the rail section 24 together with the magazine receiving section 26. FIG. 4 depicts a perspective view of the insertion and ejection mechanism 20 when the magazine receiving section 26 is moved and positioned at a most rear portion of the rail section 24. As the magazine receiving section 26 is moved to the most rear portion of the rail section 24, the wall member 22 fixed to the magazine receiving section 26 is also moved to the most rear portion of the rail section 24.

The wall member locking mechanism 30 includes a roller 30A and an urging section (which is to be described below) that urges the roller 30A in an upward direction. When the magazine receiving section 26 is moved and positioned above the roller 30A, the roller 30A is pushed by the magazine receiving section 26 and caused to move down. The roller 30A is then brought into abutment against a lower surface of the magazine receiving section 26. The roller 30A is rotatably provided. As the magazine receiving section 26 moves, the roller 30A rotates in contact with the lower surface of the magazine receiving section 26.

The magazine receiving section 26 has a slit 26a defined therein as an elongated opening at a position near a portion where the wall member 22 is mounted. The slit 26a is defined as an opening having a size capable of receiving a portion of the roller 30A. Thus, the roller 30A rotates in contact with the lower surface of the magazine receiving section 26, and when the slit 26a is positioned above the roller 30A, the roller 30A moves up so that a portion thereof enters the slit 26a. This allows the roller 30A to be engaged with the slit 26a in the magazine receiving section 26 and ensures that the magazine receiving section 26 is fixed and not moving. That is, the slit 26a serves as an engagement section arranged to be engaged with the roller 30A.

As a consequence, the wall member 22 fixed to the magazine receiving section 26 is also fixed and not moving. In FIG. 3, a locked state where the magazine receiving section 26 and the wall member 22 are fixed at a front position of the rail section 24 by the wall member locking mechanism 30 is illustrated. That is, the wall member locking mechanism 30 serves as a locking mechanism that locks the wall member 22 at a predetermined or set position (the position at which the opening in the front panel 16 is closed). In the locked state, a portion of the magazine receiving section 26 is projected to the front side with respect to the front end of the rail section 24. Therefore, as shown in FIG. 2, a portion of the magazine receiving section 26 is projected from the front panel 16, which is a portion of the housing 12 of the library apparatus 10.

Figure 5:
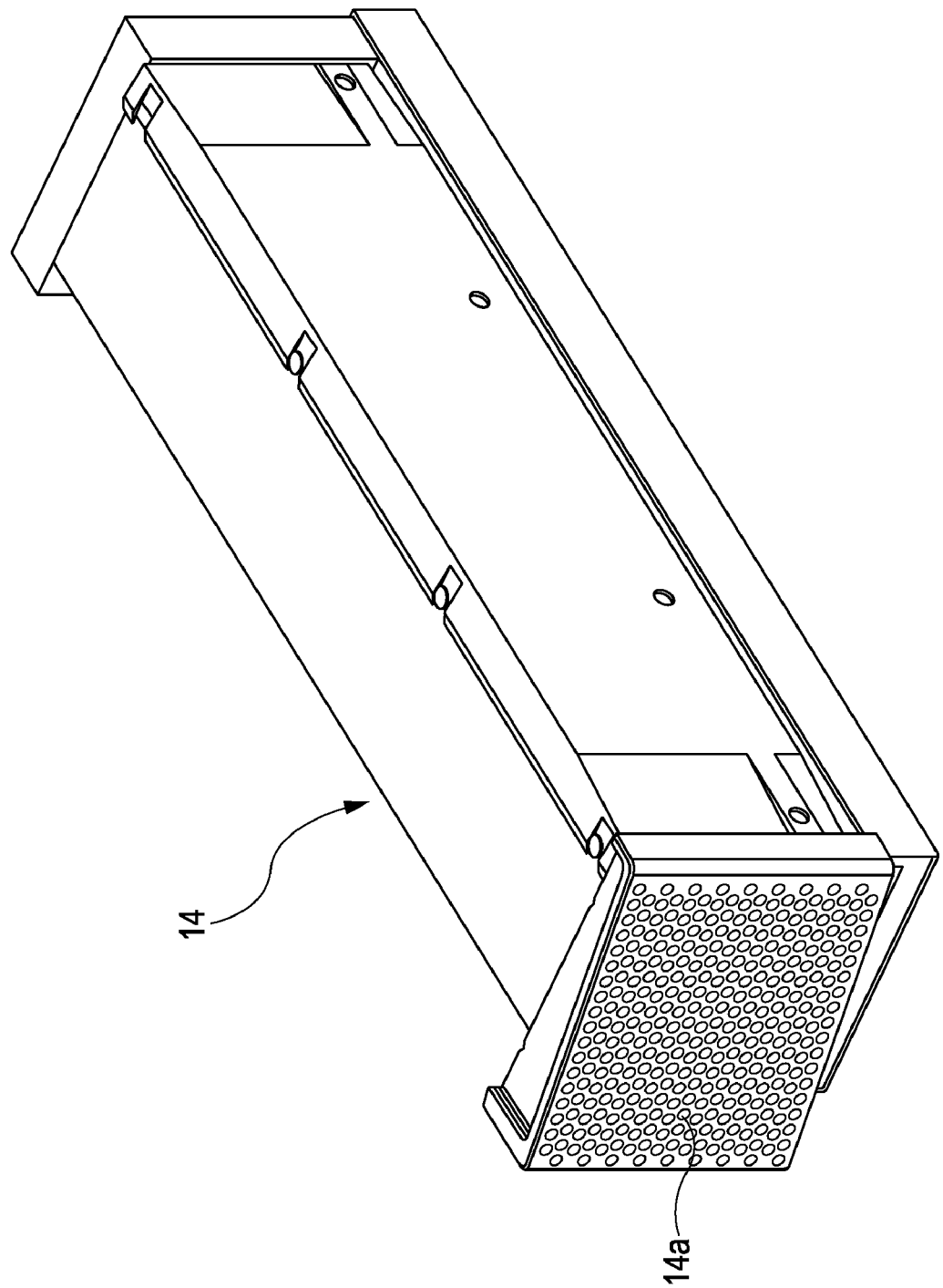
FIG. 5 depicts a perspective view of a magazine, as viewed from the top thereof, according to an example of an embodiment of the present invention.

The shape of the magazine 14 is now described. FIG. 5 depicts a perspective view of the magazine 14, as viewed from the top thereof, and FIG. 6 depicts a perspective view of the magazine 14, as viewed from the bottom thereof.

The magazine 14 has an elongated box shape whose one side surface is open, and is provided with a dressed panel 14a on a front side thereof. The dressed panel 14a is shaped so as to close the opening in the front panel 16 of the library apparatus 10 when the magazine 14 is accommodated in the library apparatus 10, and is designed to achieve a desired appearance. The magazine 14 is configured to accommodate a plurality of tape cartridges. The side surface of the magazine 14 is open to allow the transporting mechanism in the library apparatus 10 to readily access the tape cartridges received in the magazine 14 when the magazine 14 is accommodated in the library apparatus 10. The inside of the magazine 14 shown in FIGS. 5 and 6 is divided into three rows and three columns so that nine tape cartridges may be accommodated in the magazine 14.

Figure 6:
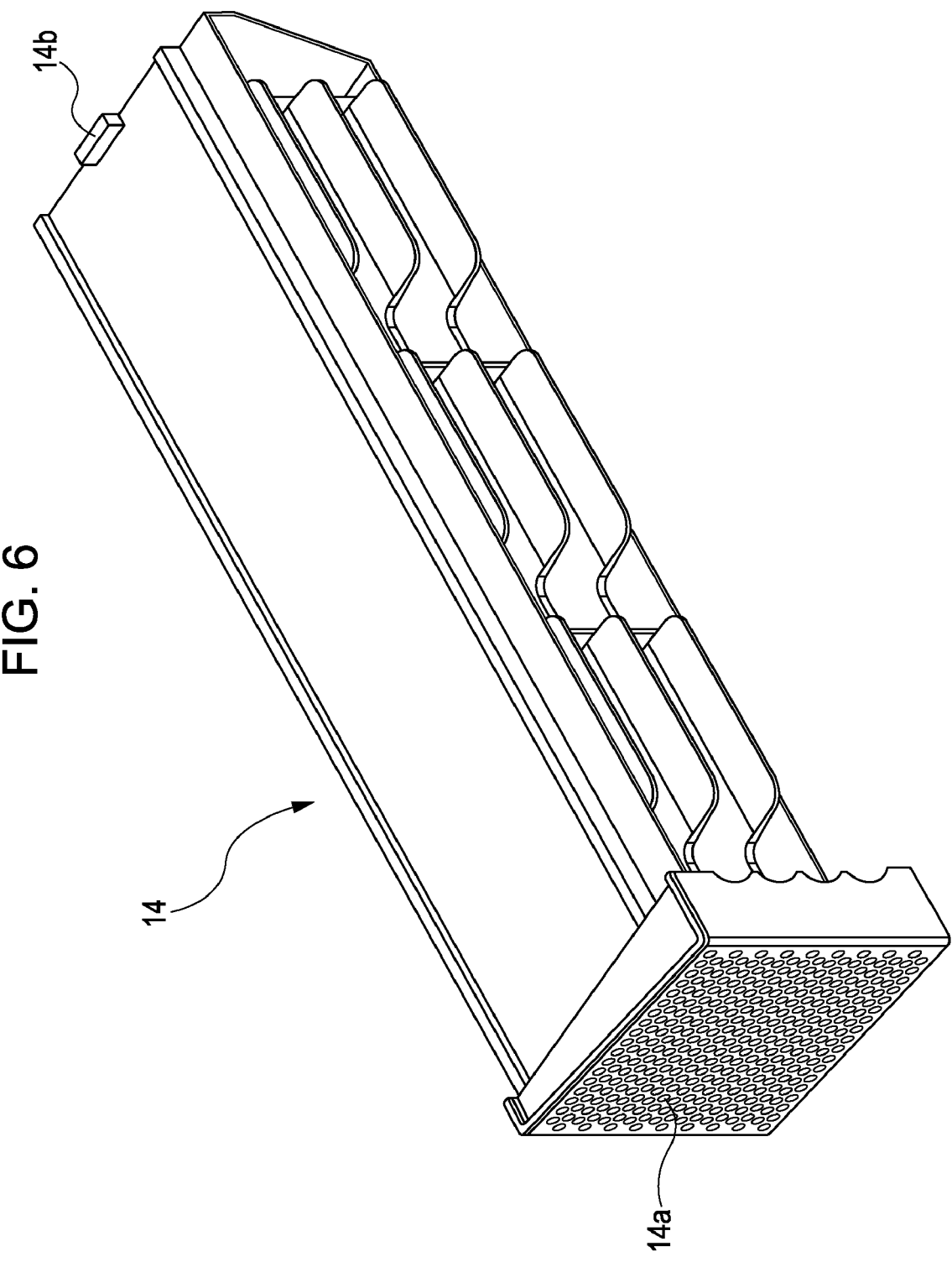
FIG. 6 depicts a perspective view of the magazine, as viewed from the bottom thereof, according to an example of an embodiment of the present invention.

As shown in FIG. 6, a projection 14b as a projecting portion is provided at the rear end of the bottom surface of the magazine 14. When the magazine 14 is accommodated in the library apparatus 10, the projection 14b extends down through the slit 26a in the magazine receiving section 26. As a result, the projection 14b is brought into engagement with a lever member of the magazine locking mechanism 28, and the magazine 14 is fixed at that position and so as not to be ejected from the library apparatus 10. The magazine locking mechanism 28 is described below.

Figure 7:
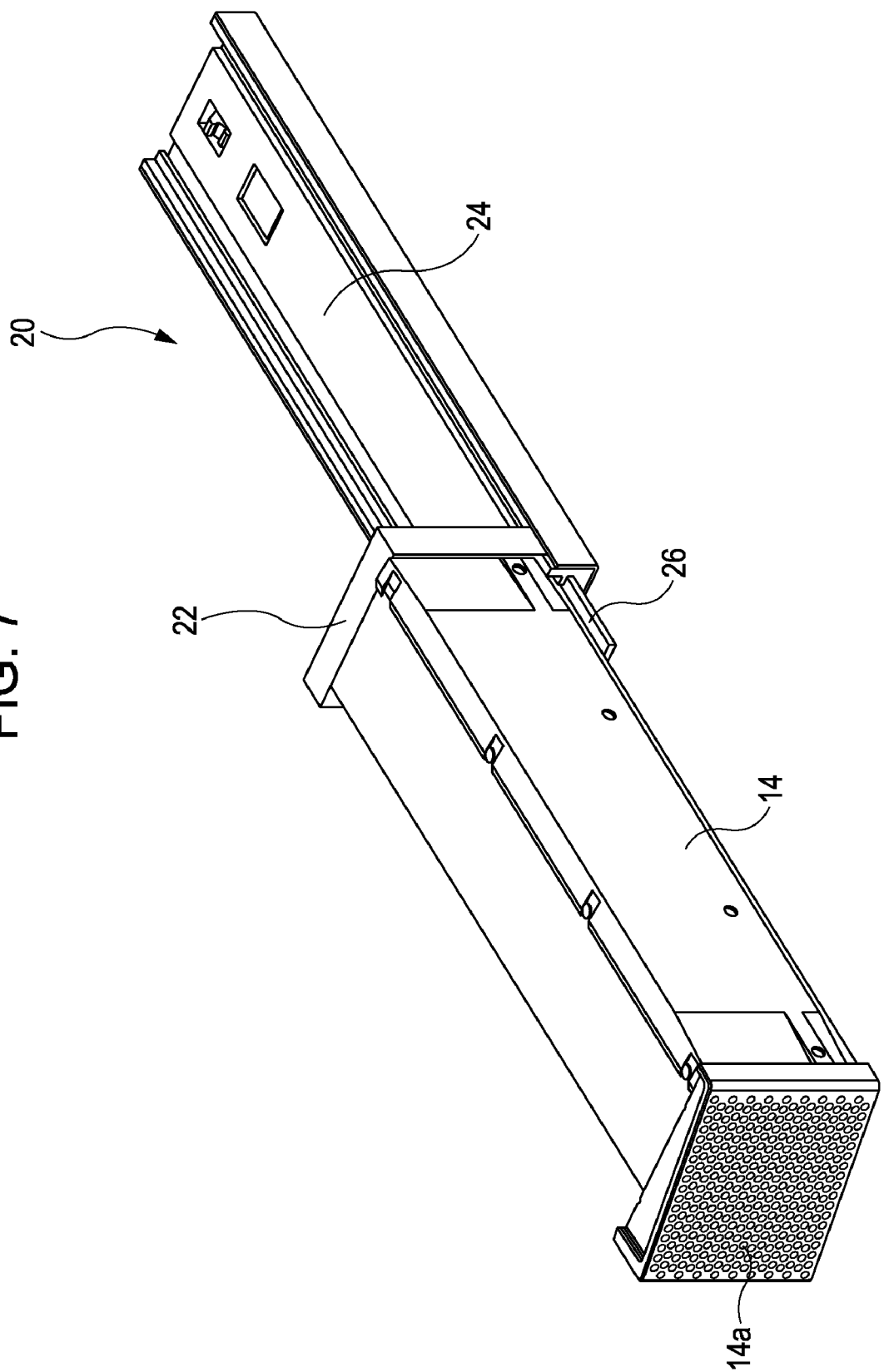
FIG. 7 depicts a perspective view of the insertion and ejection mechanism when a portion of the magazine, which is near the rear end of the magazine, is placed on the magazine receiving section, according to an example of an embodiment of the present invention.

The magazine 14 is attached to the insertion and ejection mechanism 20 shown in FIG. 3, and is inserted into the library apparatus 10. FIG. 7 depicts a perspective view of the insertion and ejection mechanism 20 when a portion of the magazine 14, which is near the rear end of the magazine 14, is placed on the magazine receiving section 26. As shown in FIG. 7, a rear portion of the magazine 14 is placed on the magazine receiving section 26 projected from the front panel 16. Then, the magazine 14 is entirely pressed so that the magazine 14 may be pushed into the library apparatus 10 together with the magazine receiving section 26 and the wall member 22.

In this state, the magazine receiving section 26 is fixed by the wall member locking mechanism 30, and it is possible to release the fixed state of the magazine receiving section 26. The fixed state of the magazine receiving section 26 is released by inserting the projection 14b of the magazine 14 into the slit 26a in the magazine receiving section 26 when the rear portion of the magazine 14 is placed on the magazine receiving section 26 projected from the front panel 16. Specifically, when the projection 14b of the magazine 14 is inserted into the slit 26a, the projection 14b pushes down the roller 30A received in the slit 26a. Thus, the engagement between the roller 30A and the slit 26a is released and therefore, the fixed state of the magazine receiving section 26 and the wall member 22 is released. Accordingly, once the magazine 14 is pushed, the magazine receiving section 26 may be pushed into the library apparatus 10 together with the magazine 14 along the rail section 24.

Figure 8:
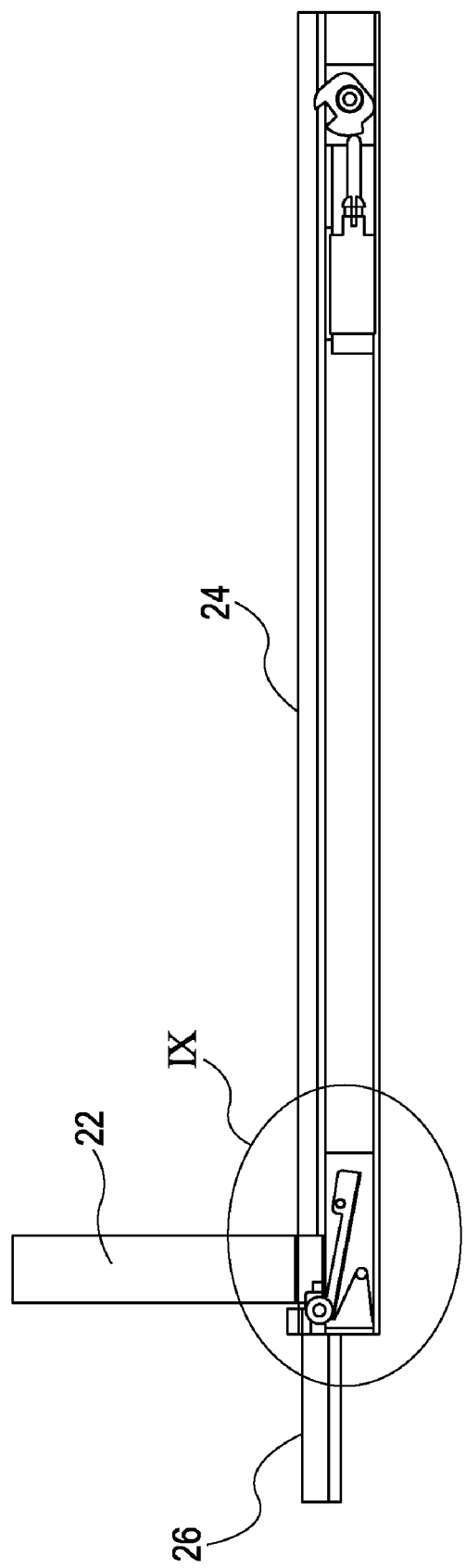
FIG. 8 depicts a cross-sectional view of the insertion and ejection mechanism when no magazine is placed, according to an example of an embodiment of the present invention.
Figure 9:
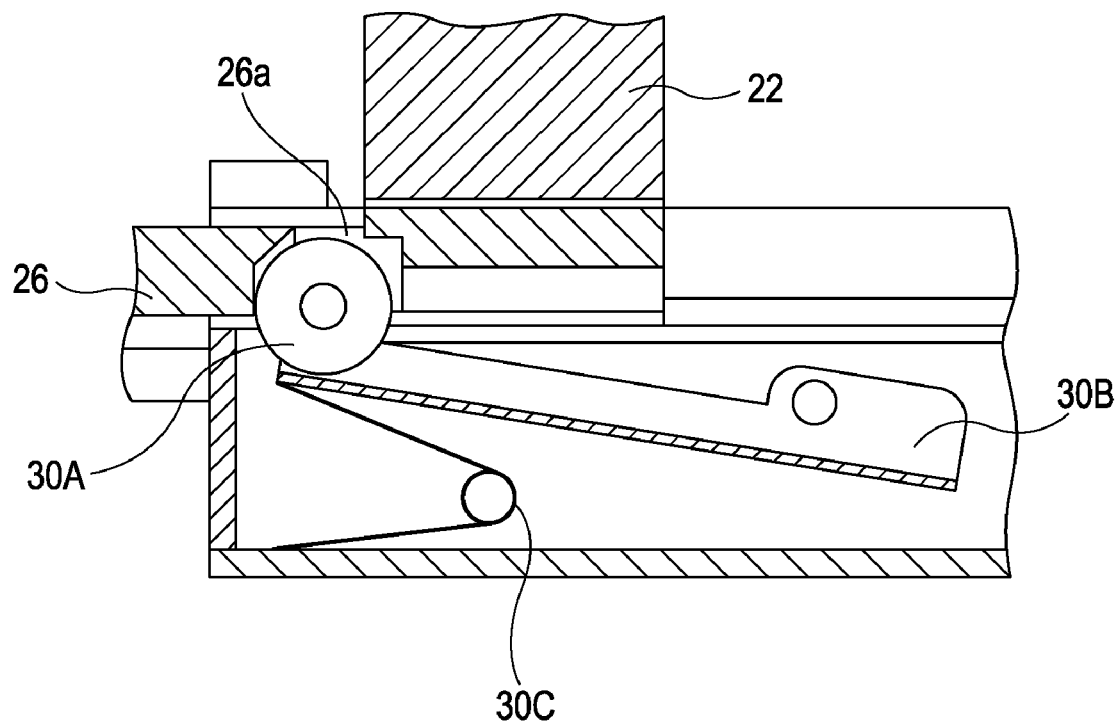
FIG. 9 depicts an enlarged view of part IX shown in FIG. 8, according to an example of an embodiment of the present invention.

The insertion operation involved in accommodating the magazine 14 in the library apparatus 10 is now be described in more detail. FIG. 8 depicts a cross-sectional view of the insertion and ejection mechanism 20 when the magazine 14 is not placed. FIG. 9 depicts an enlarged view of part IX shown in FIG. 8, and shows the wall member locking mechanism 30.

The wall member locking mechanism 30 includes the roller 30A described above, and a lever member 30B that supports the roller 30A. The roller 30A is rotatably supported at a leading end of the lever member 30B. The lever member 30B is supported rotatably with respect to the rail section 24. A spring 30C serving as an urging section is provided between the lever member 30B and the bottom surface of the rail section 24. The spring 30C urges the end of the lever member 30B where the roller 30A is supported in an upward direction.

In a state where the slit 26a in the magazine receiving section 26 is located immediately above the roller 30A, as shown in FIG. 9, a portion of the roller 30A enters the slit 26a and is engaged therewith. This ensures that the magazine receiving section 26 is fixed by the roller 30A so as not to be movable. Preferably, a half or more of the roller 30A enters the slit 26a to help prevent the roller 30A from being pushed down by the force caused by moving the magazine receiving section 26.

The spring 30C that urges the roller 30A in the upward direction is not limited to that shown in FIG. 9, and any of various springs such as a coil spring and a leaf spring may be used. The position at which such a spring is disposed is not limited to the position shown in FIG. 9, and, for example, a spring may be disposed around a shaft that rotatably supports the lever member 30B.

When the magazine receiving section 26 is fixed in the manner described above, the wall member 22, which is fixed to the magazine receiving section 26 into a single unit, is also fixed. Therefore, as shown in FIG. 2, the inside of the library apparatus 10 may be shut off from the outside thereof by using the wall member 22. This may prevent the operator's hand or the like from being inserted into the library apparatus 10, and may provide high security.

Figure 10:
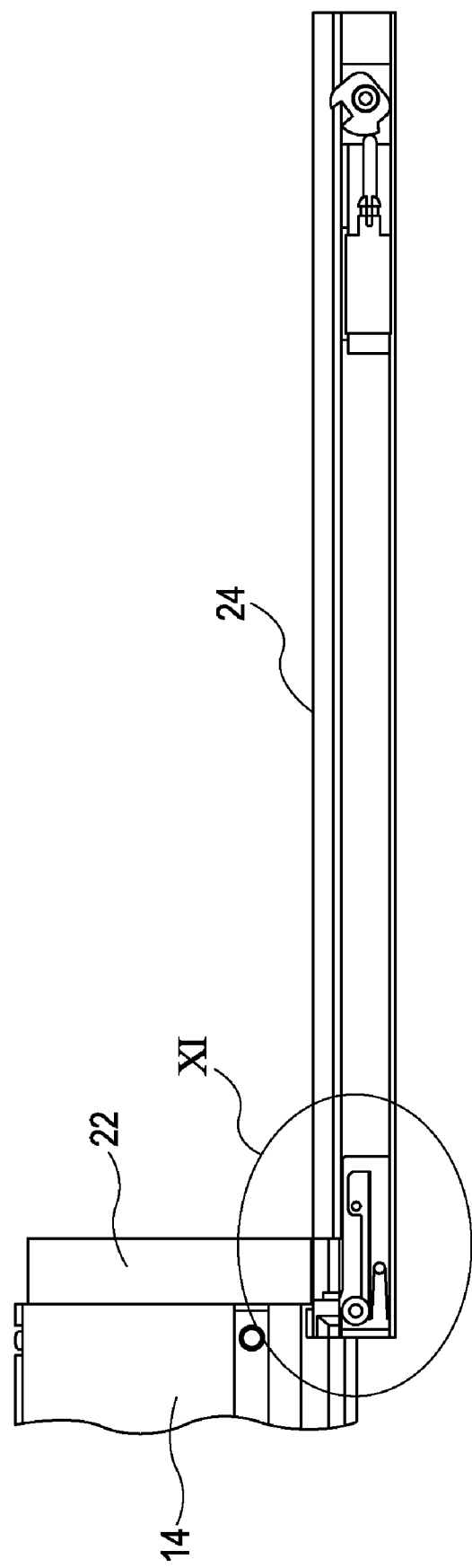
FIG. 10 depicts a cross-sectional view of the insertion and ejection mechanism when a rear portion of the magazine is placed on the magazine receiving section, according to an example of an embodiment of the present invention.
Figure 11:
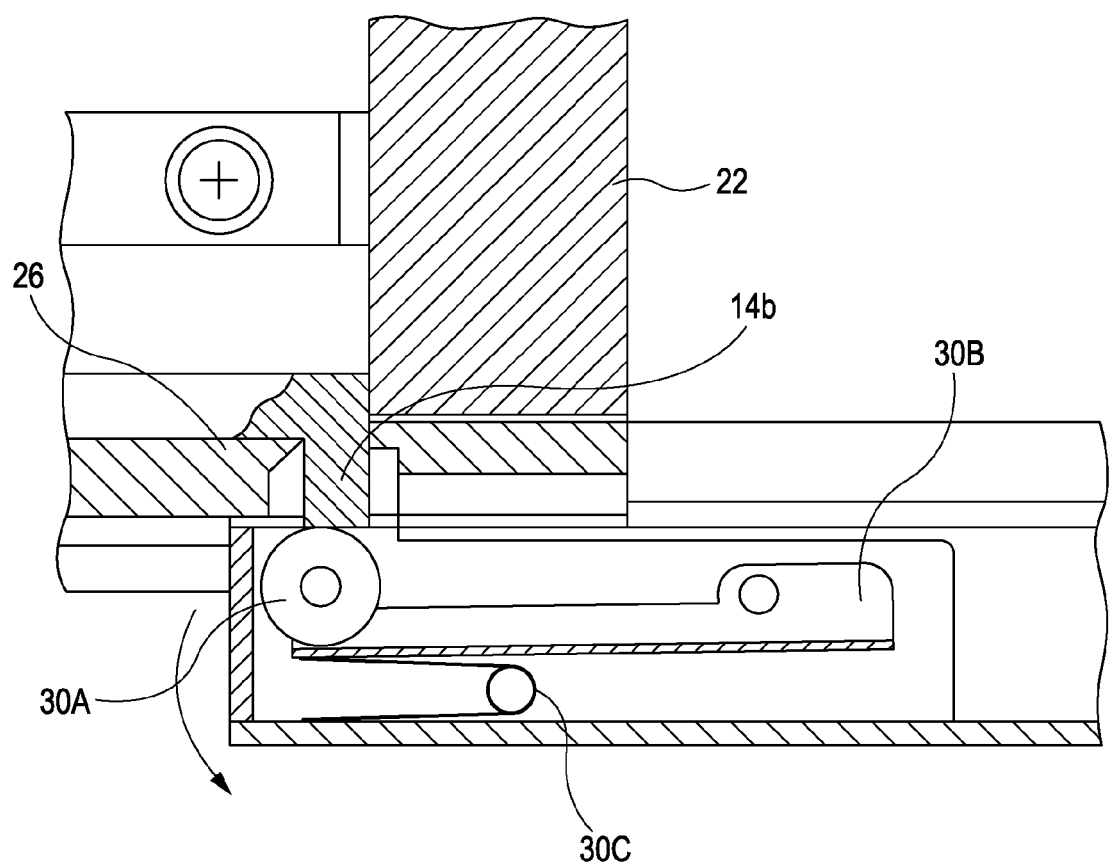
FIG. 11 depicts an enlarged view of part XI shown in FIG. 10, according to an example of an embodiment of the present invention.

When the magazine 14 is to be inserted into the library apparatus 10, first, the rear portion of the magazine 14 is placed on the magazine receiving section 26 projected from the front panel 16. FIG. 10 depicts a cross-sectional view of the insertion and ejection mechanism 20 when the rear portion of the magazine 14 is placed on the magazine receiving section 26 projected from the front panel 16. FIG. 11 depicts an enlarged view of part XI shown in FIG. 10, and shows the wall member locking mechanism 30.

When the rear portion of the magazine 14 is placed on the magazine receiving section 26 projected from the front panel 16, the projection 14b provided on the bottom surface of the magazine 14 enters the slit 26a in the magazine receiving section 26 and is engaged therewith. Thus, the projection 14b pushes down the roller 30A located in the slit 26a so that the roller 30A is brought outside the slit 26a. As a consequence, the locked state of the magazine receiving section 26 by using the roller 30A, that is, the locked state of the wall member 22, is released. This allows the magazine receiving section 26 and the wall member 22 to move toward the rear of the library apparatus 10 along the rail section 24. Accordingly, the projection 14b of the magazine 14 enters the slit 26a and is engaged therewith from a direction different from a direction in which the roller 30A enters the slit 26a and is engaged therewith from the opposite direction, thereby releasing the locked state of the wall member 22.

Figure 12:
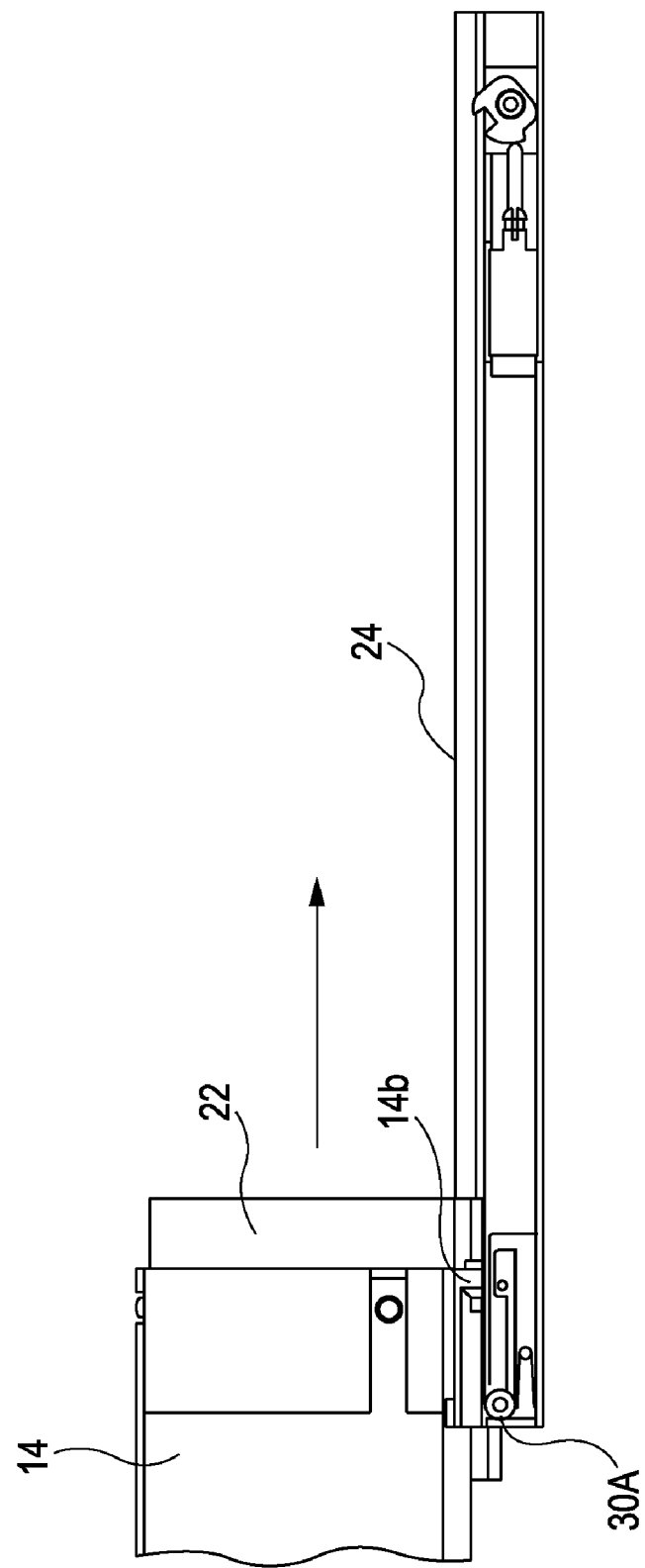
FIG. 12 depicts a cross-sectional view of the insertion and ejection mechanism when the magazine starts to be pushed into the library apparatus, according to an example of an embodiment of the present invention.
Figure 13:
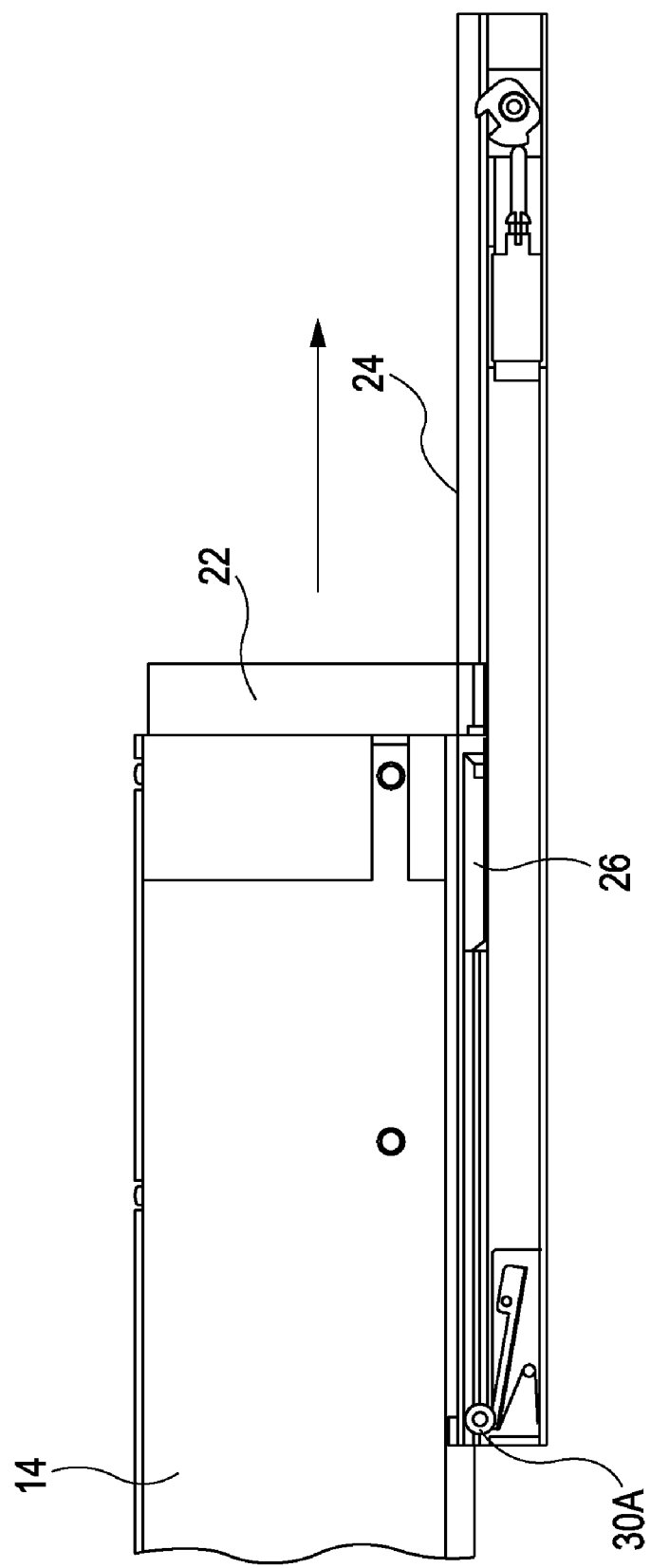
FIG. 13 depicts a cross-sectional view of the insertion and ejection mechanism when the magazine is being pushed into the library apparatus, according to an example of an embodiment of the present invention.

Pushing the magazine 14 from the front allows the magazine 14 to be inserted into the library apparatus 10 together with the magazine receiving section 26 and the wall member 22. FIG. 12 depicts a cross-sectional view of the insertion and ejection mechanism 20 when the magazine 14 starts to be pushed into the library apparatus 10. The roller 30A pushed down by the projection 14b of the magazine 14 rotates in contact with the lower surface of the magazine receiving section 26, and the magazine receiving section 26 is moved backward. When the magazine receiving section 26 is moved backward and is released from the roller 30A, the roller 30A is urged by the spring 30C in the upward direction so as to come into contact with the bottom surface of the magazine 14 in a manner shown in FIG. 13. The roller 30A continues to rotate in contact with the bottom surface of the magazine 14, and the magazine 14 may be advanced to the rear of the library apparatus 10 along the rail section 24 together with the magazine receiving section 26 and the wall member 22.

Figure 14:
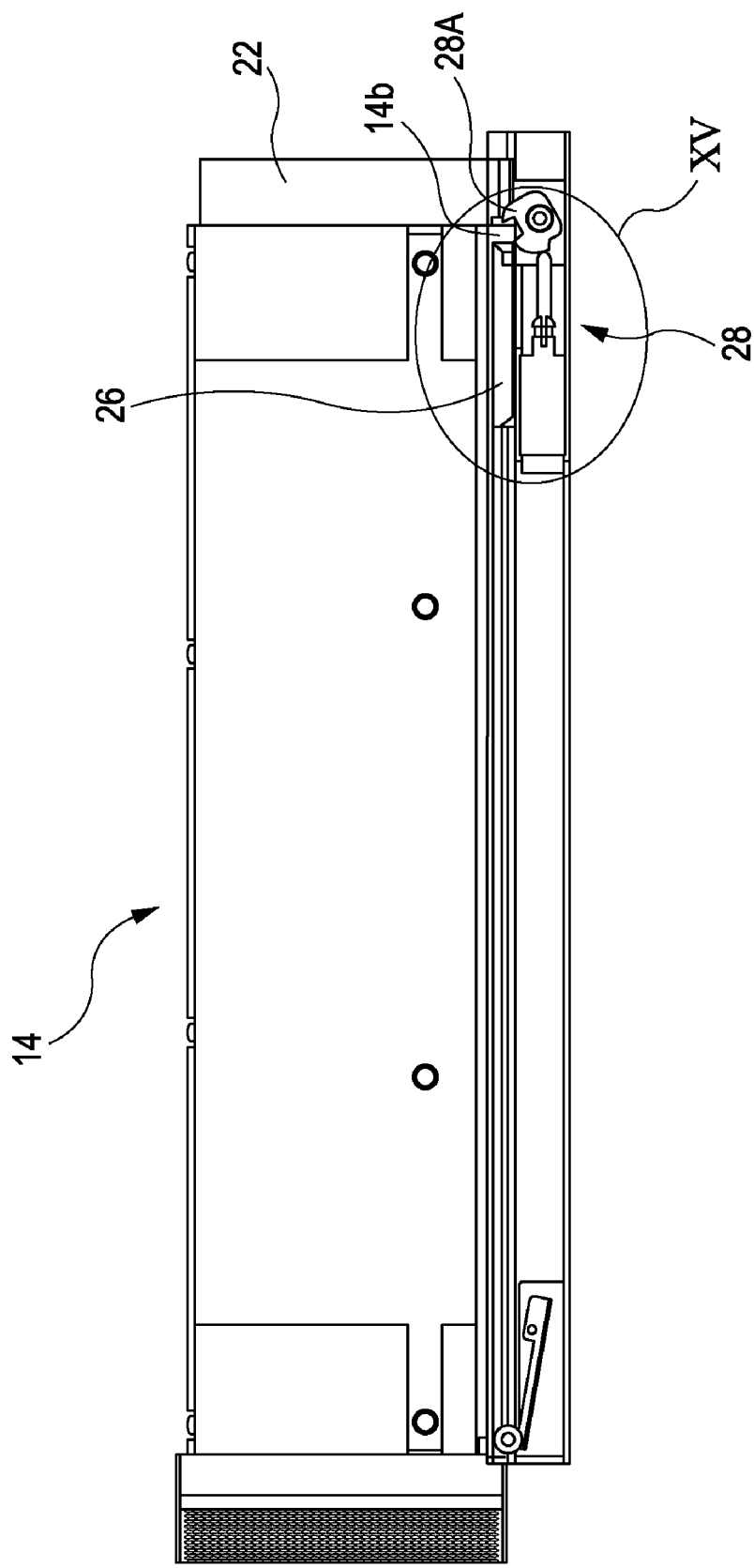
FIG. 14 depicts a cross-sectional view of the insertion and ejection mechanism when a projection of the magazine comes into abutment against a lever member of a magazine locking mechanism, according to an example of an embodiment of the present invention.
Figure 15:
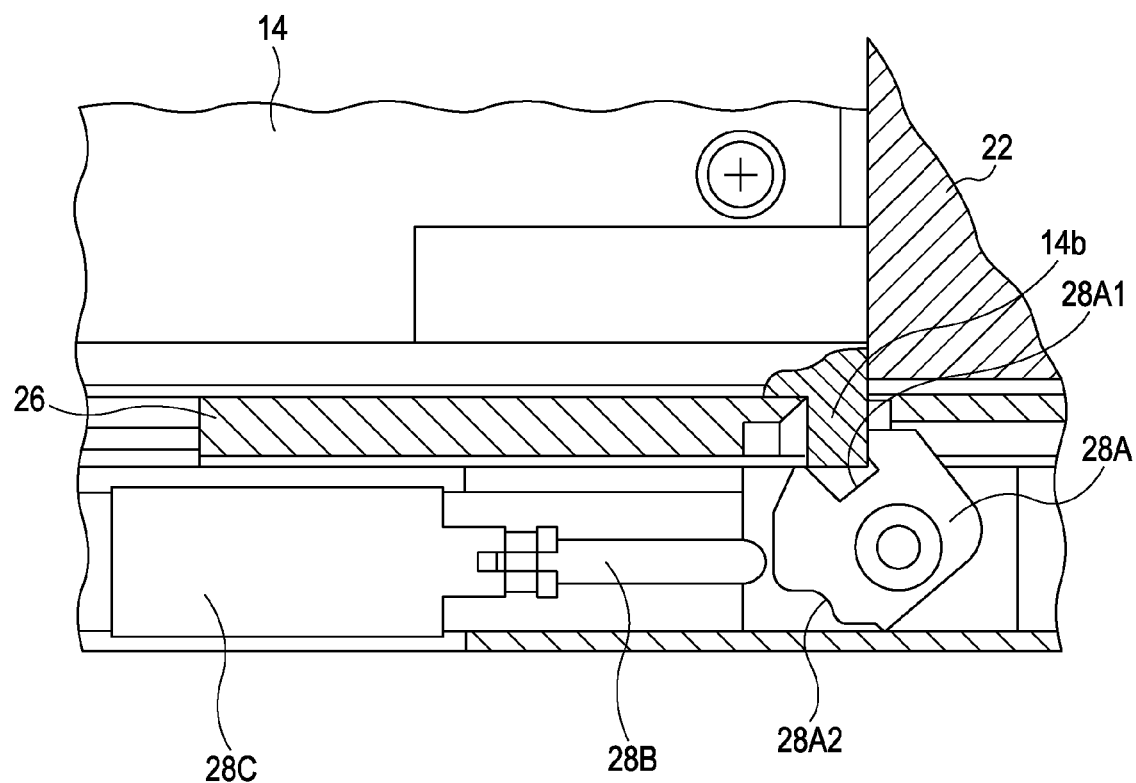
FIG. 15 depicts an enlarged view of part XV shown in FIG. 14, according to an example of an embodiment of the present invention.

When the magazine 14 is further pushed into the library apparatus 10, the projection 14b of the magazine 14 is brought into abutment against a lever member 28A of the magazine locking mechanism 28 immediately before the magazine 14 has been fully received in the library apparatus 10. FIG. 14 depicts a cross-sectional view of the insertion and ejection mechanism 20 when the projection 14b of the magazine 14 comes into abutment against the lever member 28A of the magazine locking mechanism 28. FIG. 15 depicts an enlarged view of part XV shown in FIG. 14, and is a cross-sectional view of the magazine locking mechanism 28.

Figure 16:
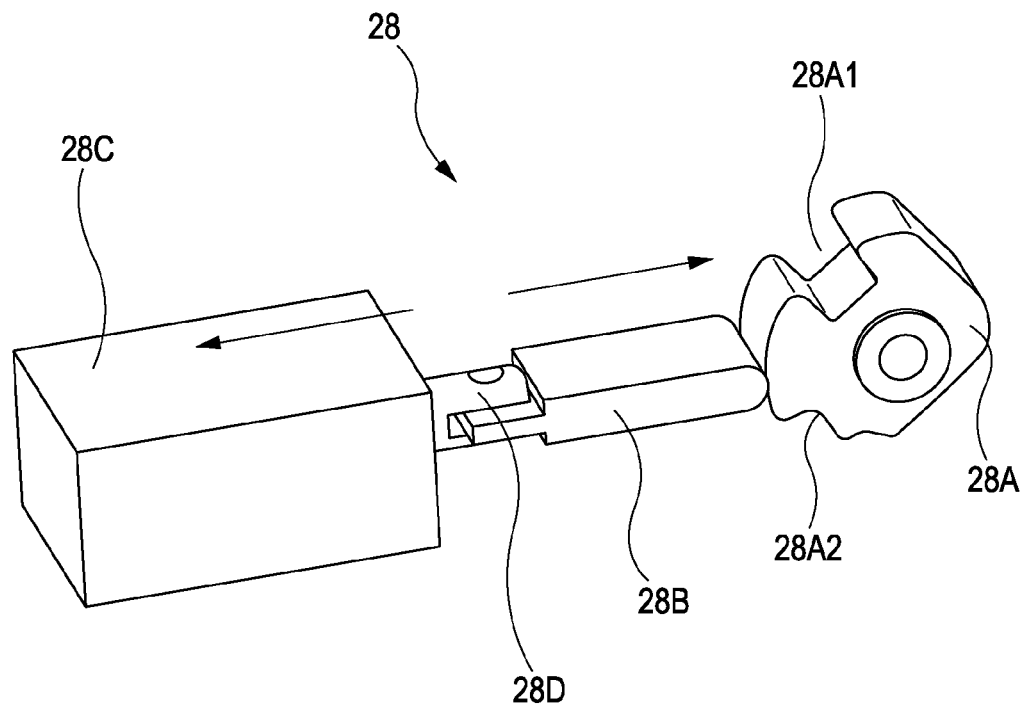
FIG. 16 depicts a perspective view of the magazine locking mechanism, according to an example of an embodiment of the present invention.

The magazine locking mechanism 28 is now be described in detail. FIG. 16 depicts a perspective view of the magazine locking mechanism 28. The magazine locking mechanism 28 includes the lever member 28A, a block 28B arranged to be abutted against the lever member 28A, and a solenoid actuator 28C. The block 28B is connected to a plunger 28D of the solenoid actuator 28C so that the block 28B may be separated from the lever member 28A. When the solenoid actuator 28C is not in operation, the plunger 28D is urged in a direction toward the lever member 28A by a spring (not shown) provided in the solenoid actuator 28C. The block 28B connected to the plunger 28D is also urged toward the lever member 28A. When the solenoid actuator 28C is not in operation, as shown in FIG. 16, the leading end of the block 28B comes into abutment against the lever member 28A.

The lever member 28A is rotatably supported between a magazine fixed position and a magazine fixed state releasing position. The lever member 28A shown in FIG. 16 is located at the magazine fixed state releasing position. An engagement groove 28A1 for receiving the projection 14b of the magazine 14 and a block engagement recess 28A2 for receiving the leading end of the block 28B are defined in an outer periphery of the lever member 28A. When the engagement groove 28A1 is diagonally positioned, as described below, the locked state of the magazine 14 is released, and the leading end of the block 28B is not engaged with the block engagement recess 28A2. When the projection 14b of the magazine 14 is engaged with the engagement groove 28A1 to cause the lever member 28A to rotate and the engagement groove 28A1 is directed upward, as described below, the leading end of the block 28B is brought into engagement with the block engagement recess 28A2 of the plunger 28A to help prevent the rotation of the lever member 28A. At this time, the lever member 28A is located at the magazine fixed position.

Referring back to FIG. 14, description is continued here. When the magazine 14 is pushed into the library apparatus 10, the projection 14b of the magazine 14 is brought into engagement with the engagement groove 28A1 of the lever member 28A of the magazine locking mechanism 28 immediately before the magazine 14 has been fully received in the library apparatus 10. At this time, the lever member 28A is located at the fixed state releasing position, and the block 28B is not engaged with the block engagement recess 28A2. The lever member 28A is therefore rotatable.

Figure 17:
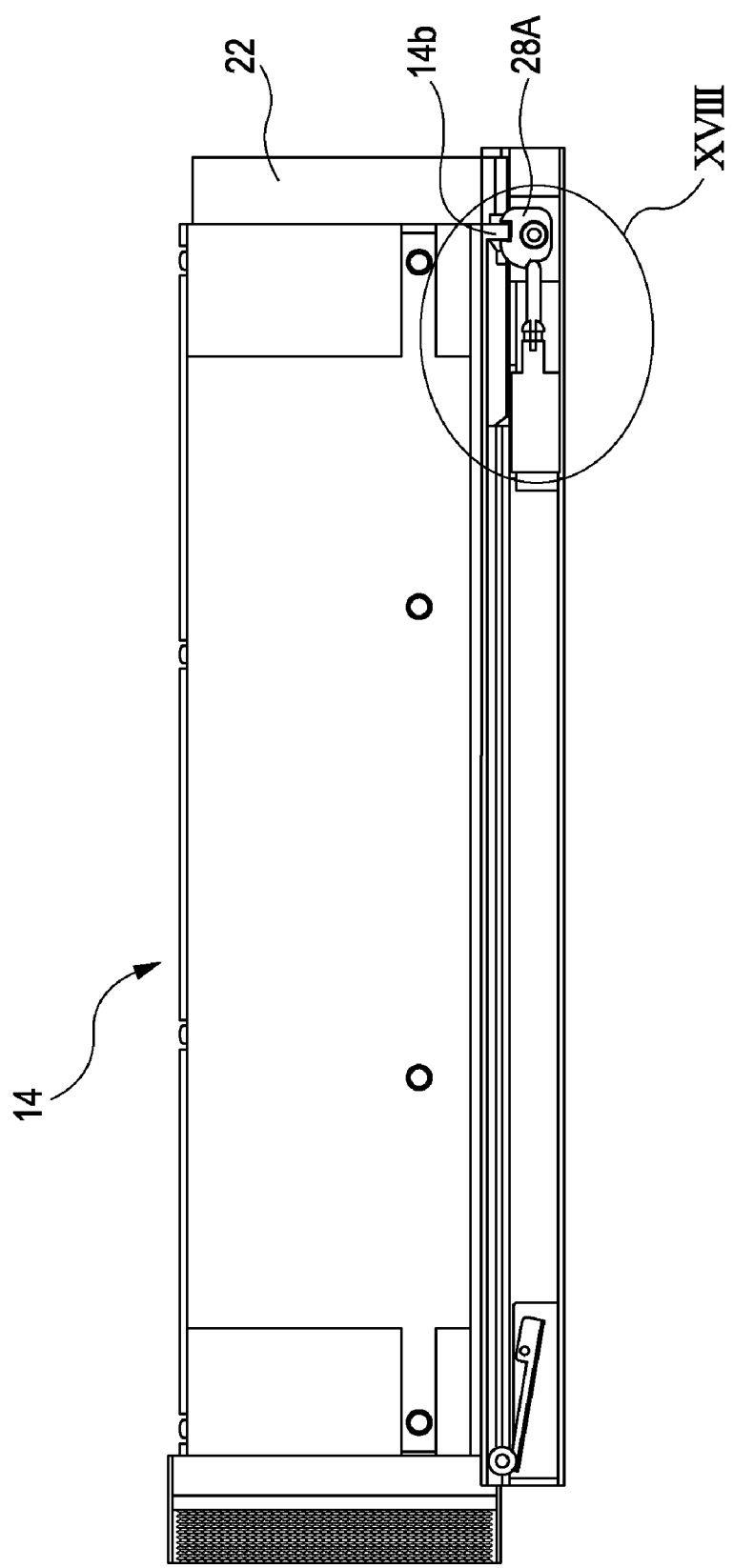
FIG. 17 depicts a cross-sectional view of the insertion and ejection mechanism when the magazine is completely pushed into the library apparatus, according to an example of an embodiment of the present invention.
Figure 18:
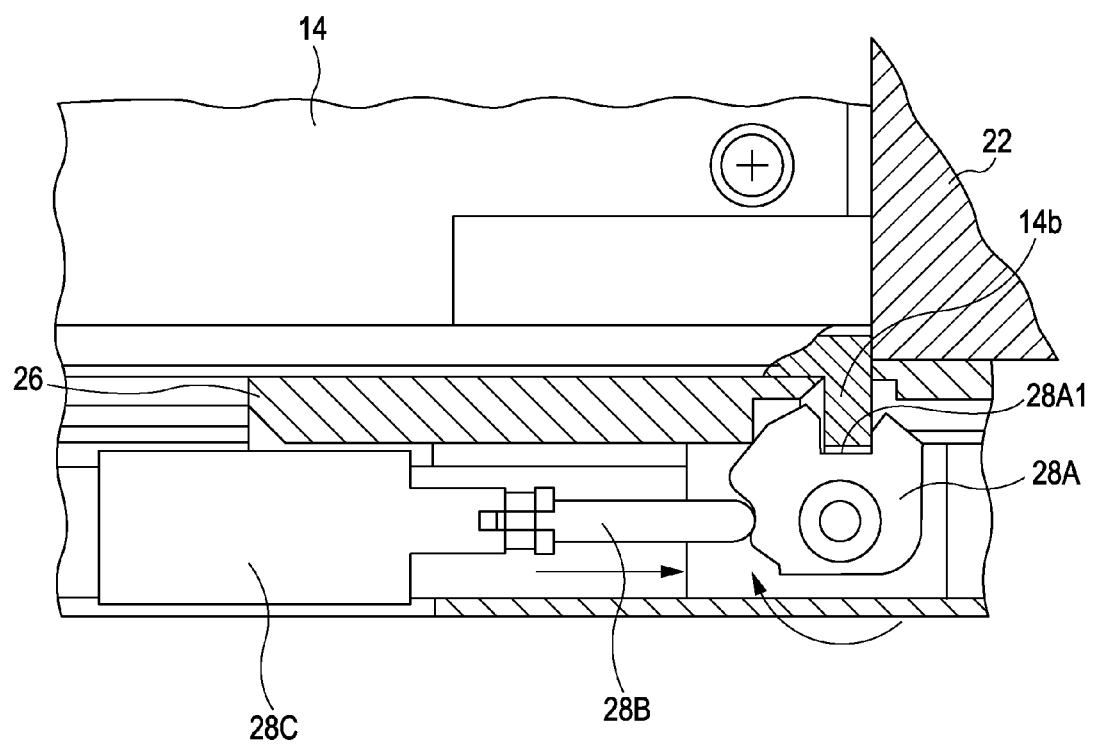
FIG. 18 depicts an enlarged view of part XVIII shown in FIG. 17, according to an example of an embodiment of the present invention.

When the magazine 14 is further pushed into the library apparatus 10 from the state shown in FIG. 14, the projection 14b pushes and causes the lever member 28A to rotate, and the engagement groove 28A1 is directed upward. Thus, the projection 14b is fully received in the engagement groove 28A1 and is brought into engagement therewith. FIG. 17 depicts a cross-sectional view of the insertion and ejection mechanism 20 when the magazine 14 is completely pushed into the library apparatus 10. FIG. 18 depicts an enlarged view of part XVIII shown in FIG. 17, and is a cross-sectional view of the magazine locking mechanism 28.

When the magazine 14 is completely pushed into the library apparatus 10, the projection 14b is brought into engagement with the engagement groove 28A1, and the leading end of the block 28B is also brought into engagement with the block engagement recess 28A2. As a consequence, the lever member 28 is fixed by the engagement of the block 28B and is prevented from rotating. Thus, the projection 14b of the magazine 14 is kept in engagement with the engagement groove 28A1 of the lever member 28A, and the magazine 14 is fixed. The magazine 14 is not removed from the library apparatus 10 unless the projection 14b is released from the engagement groove 28A1 due to the rotation of the lever member 28A, thus ensuring that the magazine 14 is locked. Therefore, the operation of inserting the magazine 14 is completed.

Figure 19:
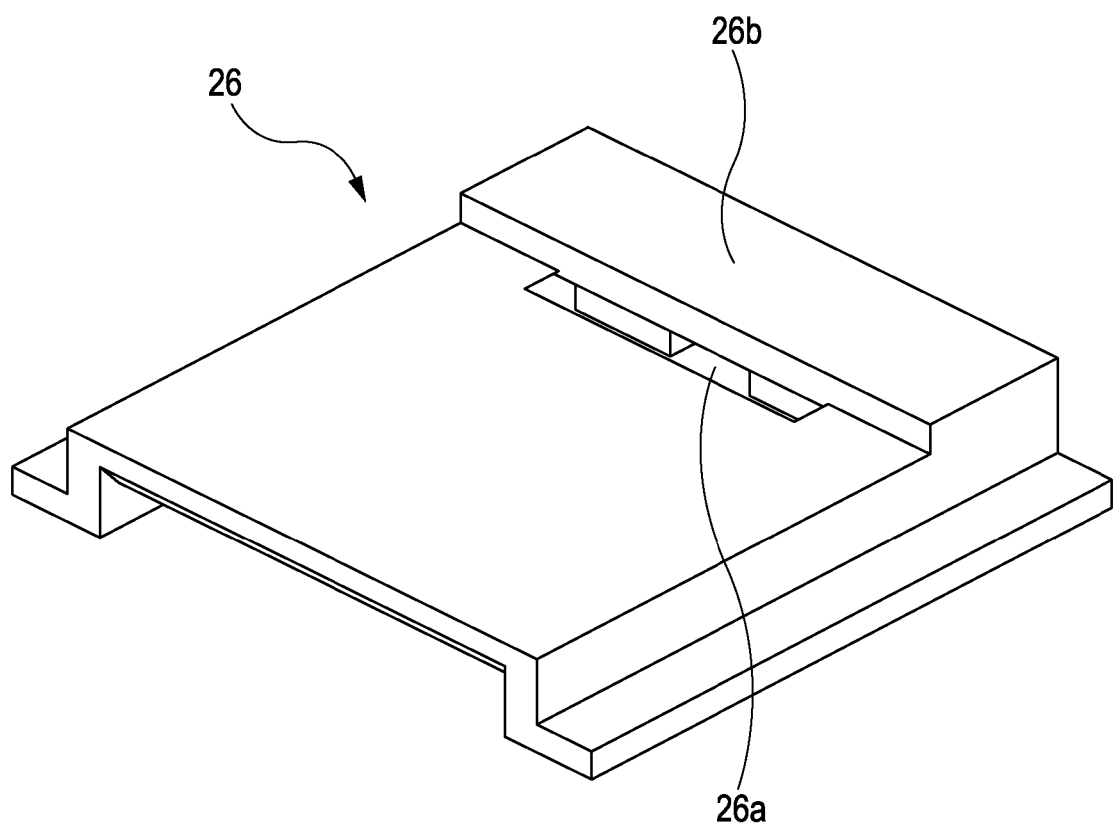
FIG. 19 depicts a perspective view of the magazine receiving section, as viewed from the top thereof, according to an example of an embodiment of the present invention.
Figure 20:
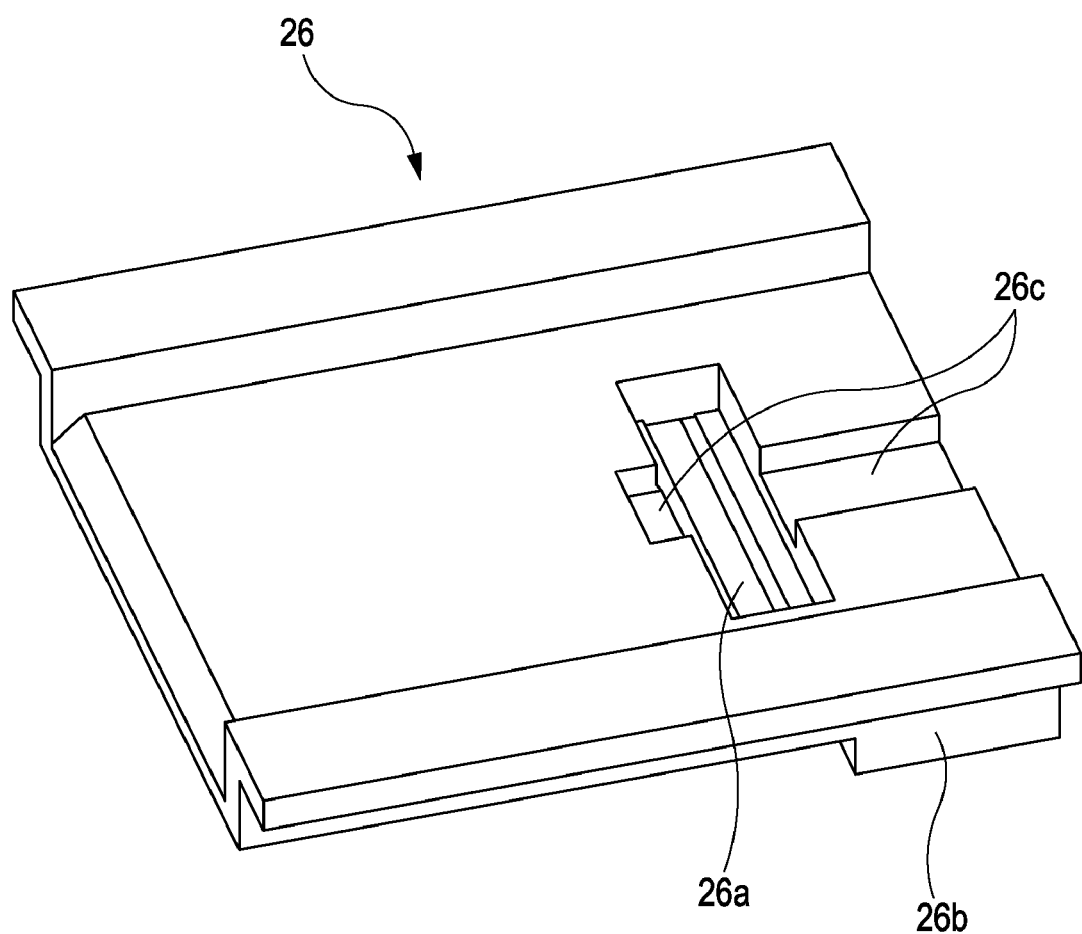
FIG. 20 depicts a perspective view of the magazine receiving section, as viewed from the lower side thereof, according to an example of an embodiment of the present invention.

The magazine receiving section 26 is now be described in more detail with reference to FIGS. 19 and 20. FIG. 19 depicts a perspective view of the magazine receiving section 26, as viewed from the top thereof, and FIG. 20 depicts a perspective view of the magazine receiving section 26, as viewed from the lower side thereof. The magazine receiving section 26 has a wall member mounting section 26b defined thereon for fixing the wall member 22, and the wall member 22 is firmly fixed to the wall member mounting section 26b using a clamping member (not shown) such as a bolt. The wall member 22 is therefore integrated with the magazine receiving section 26 into a single unit so that as the magazine receiving section 26 moves, the wall member 22 may also move. The slit 26a is defined at a position close to the wall member mounting section 26b in front of the wall member mounting section 26b. When the magazine 14 is placed on the magazine receiving section 26 in such a manner that the rear surface of the magazine 14 comes into abutment against the wall member 22, the projection 14b provided on the bottom surface of the magazine 14 automatically enters the slit 26a. Therefore, when the magazine 14 is to be inserted, a rear portion of the magazine 14 is placed on the magazine receiving section 26 to release the locked state of the magazine receiving section 26 and the wall member 22. No need exists for a special operation for releasing the locked state.

Further, the magazine receiving section 26 is moved to the position shown in FIG. 14 with the projection 14b of the magazine 14 entering the slit 26a. In order to facilitate the engagement of the projection 14b entering the slit 26a with the engagement groove 28A1 in the lever member 28A, as shown in FIG. 20, a clearance groove 26c having a larger width than the lever member 28A is defined in the lower surface of the magazine receiving section 26. The engagement groove 28A1 of the lever member 28A is therefore engageable with the projection 14b received in the slit 26a without interfering with the rear end of the magazine receiving section 26.

Next, the ejection operation for ejecting the magazine 14 from the library apparatus 10 is described.

When the magazine 14 is to be ejected, the operator inputs a magazine ejection instruction to the library apparatus 10. The instruction is input through, for example, the operation panel 18. When a magazine ejection instruction is input, a control section of the library apparatus 10 drives the solenoid actuator 28C of the magazine locking mechanism 28. Thus, the block 28B is moved apart from the lever member 28A and the leading end of the block 28B is released from the block engagement recess 28A2.

For example, a spring or the like is disposed to urge the magazine receiving section 26 or the wall member 22 in a forward direction, i.e., in a direction in which the magazine 14 is removed, when the magazine 14 is completely pushed into the library apparatus 10. When the locked state of the lever member 28A is released, the projection 14b, which is to move forward, pushes the lever member 28A in the rotation direction. This causes the lever member 28A to rotate and allows the projection 14b to be released from the engagement groove 28A1 of the lever member 28A. The state of the insertion and ejection mechanism 20 and the magazine locking mechanism 28 at this time is substantially the same as that shown in FIG. 14, which is not be discussed herein.

When the magazine 14 is slightly projected from the front panel 16 of the library apparatus 10 (the state shown in FIG. 14) in response to an input magazine ejection instruction, the operator manually pulls the magazine 14 out of the library apparatus 10. As a consequence, the state shown in FIG. 10 is obtained through the state shown in FIG. 13 and the state shown in FIG. 12 in the order opposite to that of the magazine insertion operation. Since the projection 14c is engaged with the slit 26a, as the magazine 14 is pulled out, the magazine receiving section 26 and the wall member 22 also move forward along the rail section 24.

In the state shown in FIG. 10, the magazine 14 is completely pulled out of the library apparatus 10 while the magazine 14 is still placed on the magazine receiving section 26. Then, the operator lifts up the magazine 14 and removes it from the magazine receiving section 26, thus allowing the projection 14b entering the slit 26a to be pulled out from the slit 26a. This causes the roller 30A of the wall member locking mechanism 30 to move up and enter the slit 26a (the state shown in FIG. 8 is obtained). As a consequence, the magazine receiving section 26 is fixed at the current position. The wall member 22 is also fixed while closing the opening of the front panel 16.

According to various examples of embodiments described herein, therefore, a compact and simple mechanism is merely added to the rail section 24 to automatically perform the operation of fixing the magazine 14 when the magazine 14 is placed and closing the opening after the magazine 14 has been removed. While the compactness of the library apparatus 10 is maintained, security may be increased.

In the foregoing examples of embodiments, tape cartridges each including a magnetic recording tape as a recording medium are accommodated in the magazine 14. Alternatively, for example, cartridges including recording media other than magnetic recording tapes, such as a compact disc read-only memory (CD-ROM), may be accommodated in the magazine 14. In this case, a mechanism for reading a CD-ROM is provided in the library apparatus 10. Alternatively, a compact disc recordable (CD-R) may be directly accommodated in the magazine 14.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

What is claimed is:

1. A library apparatus comprising:
a housing having an opening; and
an insertion and ejection mechanism configured to insert and eject a magazine through the opening, and the magazine being arranged to accommodate a cartridge that includes a storage medium;
wherein the insertion and ejection mechanism includes
a magazine receiving section configured to removably mount the magazine, the magazine receiving section including an engagement section configured to be engaged with a portion of the magazine,
a guide rail configured to slidably support the magazine receiving section, and
a wall member standing on the magazine receiving section, the wall member configured to move together with the magazine receiving section and the magazine along the guide rail and to close the opening when the magazine receiving section is extended out of the housing.

2. The library apparatus according to claim 1, further comprising:
a locking mechanism configured to fix the wall member at a predetermined position once the magazine has been ejected from the insertion and ejection mechanism.

3. The library apparatus according to claim 2, wherein the engagement section comprises a slit, and wherein the magazine has a projecting portion and the projecting portion of the magazine is arranged to be engaged with the slit.

4. The library apparatus according to claim 3, wherein the locking mechanism is configured to engage with the slit from a direction different from a direction in which the projecting portion of the magazine is engaged with the slit to lock the wall member once the magazine receiving section reaches a predetermined position.

5. The library apparatus according to claim 4, wherein the locking mechanism releases the wall member from being locked once the projecting portion of the magazine is engaged with the engagement section of the magazine receiving section.

6. The library apparatus according to claim 1, wherein the magazine receiving section extends outward from the housing upon the ejection of the magazine.

7. An insertion and ejection mechanism that is configured to insert and eject a magazine through an opening formed in a housing of an apparatus, the insertion and ejection mechanism comprising:
 a magazine receiving section configured to removably mount the magazine, the magazine receiving section including an engagement section configured to be engaged with the magazine;
 a guide rail configured to slidably support the magazine receiving section; and
 a wall member standing on the magazine receiving section, the wall member configured to move together with the magazine receiving section along the guide rail and to close the opening when the magazine receiving section is extended out of the housing.

8. The insertion and ejection mechanism according to claim 7, further comprising:
 a locking mechanism configured to fix the wall member at a predetermined position once the magazine is ejected from the insertion and ejection mechanism.

9. The insertion and ejection mechanism according to claim 8, wherein the engagement section includes a slit, and
 wherein the magazine includes a projecting portion and the projecting portion of the magazine is configured to be engaged with the slit.

10. The insertion and ejection mechanism according to claim 9, wherein the locking mechanism is configured to engage with the slit from a direction different from a direction in which the projecting portion of the magazine is engaged with the slit to lock the wall member once the magazine receiving section reaches a predetermined position.

11. The insertion and ejection mechanism according to claim 10, wherein the locking mechanism is configured to release the wall member from being locked once the projecting portion of the magazine is engaged with the engagement section of the magazine receiving section.

12. The insertion and ejection mechanism according to claim 7, wherein the magazine receiving section extends outward from the housing upon the ejection of the magazine.

13. An apparatus comprising:
 a housing having an opening; and
 an insertion and ejection mechanism configured to insert and eject a magazine through the opening, and the magazine being arranged to accommodate a cartridge that includes a storage medium; the insertion and ejection mechanism including
 a magazine receiving section configured to removably mount the magazine, the magazine receiving section including an engagement section configured to be engaged with a portion of the magazine,
 a guide rail configured to slidably support the magazine receiving section, and
 a wall member standing on the magazine receiving section, the wall member configured to move together with the magazine receiving section and the magazine along the guide rail and to close the opening of the housing along the guide rail,
 wherein the wall member is located at a first end of the guide rail when the magazine is mounted on the guide rail,
 the wall member is located at a second end of the guide rail when the magazine is ejected from the opening of the housing,
 the wall member closes the opening of the housing when the wall member is located at the second end.

* * * * *